United States Patent Office 2,997,368
Patented Aug. 22, 1961

2,997,368
PRODUCTION OF MANGANESE HYDROXIDE
Mark Barent and Sydney Walgate Johnson, both of 40 New Court, Lincoln's Inn, London W.C. 2, England
No Drawing. Filed Dec. 9, 1957, Ser. No. 701,367
Claims priority, application Great Britain Dec. 20, 1956
7 Claims. (Cl. 23—145)

This invention relates to the production of manganese hydroxide from liquors containing manganese salts. Such liquors are produced as by-products from oxidations with manganese compounds in which the manganese is in a higher state of oxidation than manganous, e.g. manganese dioxide, manganic oxide, manganic salts or manganates or permanganates. These liquors contain impurities which it is frequently difficult to remove. Accordingly such liquors are frequently either treated as waste or are treated to recover manganese compounds in a crude impure form. It is an object of the invention to prepare from such by-product liquors manganese hydroxide in a very pure form.

A typical instance of the production of liquors containing manganese salts by a process involving the oxidation of an organic compound is that in which manganese dioxide is used to oxidise aniline to benzoquinone. The resulting liquors after separation of the benzoquinone contain manganese sulphate, sulphuric acid, aniline sulphate, ammonium sulphate and alkaline earth metal sulphates derived from the original manganese dioxide ore together with other impurities derived from the original ore and from the plant, and are highly acidic in character. After neutralisation of the greater part of the excess acid with lime, they contain additional quantities of calcium sulphate. Most of the heavy metal salt impurities are relatively unimportant since they either precipitate on neutralisation of the excess acid or are held up in solution by the ammonium sulphate. By rendering the solution alkaline the manganese may be precipitated as the hydroxide, but alkali metal or alkaline earth metal compounds are liable to contaminate the precipitate.

The present invention is based on the discovery that if the liquor after neutralisation of the excess acid is treated with an oxide or hydroxide as hereinafter specified at a pH value not exceeding 9 and in the presence of an ammonium compound to precipitate manganese hydroxide, the precipitated manganese hydroxide is substantially free from alkali metal and alkaline earth metal compounds even if such compounds were used for the precipitation.

The oxide or hydroxide used for the precipitation must be one which does not form an insoluble salt with the acid radicals present in the reaction mixture and which when dissolved or stirred with water is capable of imparting a pH value of at least 10 to the aqueous medium. For practical purposes such oxides or hydroxides are those of the alkali or alkaline earth metals or of ammonium or organic bases or of magnesium. Obviously if the acid radicals present are sulphates the use of an alkaline earth metal hydroxide is not permisssible whereas if the sulphate radical is substantially absent and the acid radicals present are chlorides any of the hydroxides specified above may be used.

By operating in accordance with the invention it is possible to remove by precipitation as hydroxide up to 85% of the manganese present in the liquor and the precipitated manganese hydroxide is found to contain not more than 0.03% of calcium or other alkaline earth metals and not more than 0.01% of sodium if caustic soda was used as the precipitant. This is surprising because calcium and sodium are adsorbed on precipitated manganese hydroxide if the pH value of the liquid precipitation medium is permitted to rise above 9.0.

In carrying the invention into effect starting from a liquor containing one or more ammonium compounds such as a sulphate, it is convenient first to neutralise the greater part of excess acid with lime to a pH value of about 4.0. At this stage the liquor is filtered so that any iron present is removed as ferric oxide or hydroxide and any calcium sulphate formed during the neutralisation is also removed. The oxide or hydroxide used for the precipitation is then added until a pH value within the range 8.0 to 8.5 is established when the liquor is again filtered. This removes any other metal compounds precipitated before the manganese. If the liquor contains less than 5% of manganese it is convenient to effect the second filtration at a pH value of 8.5 since the separated precipitate will contain substantially no manganese but will consist almost enitrely of precipitated impurities. If, however, the liquor contains more than 5% manganese compounds it is preferable to effect such second filtration at a value not exceeding pH 8.0. The preliminary filtration at about pH 4.0 is not essential but it is desirable since it assists recovery of the precipitated impurities in that it separates the bulk of the iron and calcium sulphate from the remaining impurities which are not precipitated at about pH 4.0.

The precipitating oxide or hydroxide is then added in such quantities that the pH value of the liquor never rises above 9.0 and the precipitate formed consists of manganese hydroxide of the purity stated above.

The residual liquor which contains 15% of the manganese originally present may be further worked up by precipitating the manganese preferably as the carbonate and returning the precipitated carbonate to a fresh batch of the original liquor for treatment in accordance with the invention.

If the original liquor is devoid of ammonium compounds ammonia or ammonium salts must be introduced at some stage prior to the precipitation of the manganese. Such addition may be very small and need not exceed an amount necessary to make a 1% concentration of ammonia in the liquor. Larger quantities may be added without disadvantage. Such addition is preferably only effected after the filtration at a pH within the range 8.0 to 8.5 and may be effected by direct addition of an ammonium salt prior to the precipitation of the manganese, and after the filtration referred to above or by using ammonium hydroxide as the precipitating oxide or hydroxide after such filtration.

The invention is further illustrated in the following examples.

*Example 1*

This example illustrates the process applied to a manganese liquor containing more than 5% of manganese.

A manganese sulphate liquor obtained from the manufacture of hydroquinone contained the following principal inorganic components:

Manganese sulphate ($MnSO_4$)____ 186 grams per litre.
Manganese (Mn)_____ 68.4 grams per litre, or 6.84% w./v.
Ammonium sulphate (($NH_4)_2SO_4$)_____ 33 grams per litre.
Sulphuric acid_____ 98 grams per litre.
Suspended matter_____ 1.3 grams per litre.

Dry free flowing lime powder (92.5% $Ca(OH)_2$) was fed slowly into 1000 litres of vigorously stirred liquor until the pH value rose to 8. The lime neutralised the free sulphuric acid and separated as calcium sulphate. It also precipitated other matter insoluble in liquor of pH value 8. About 80 kgs. of the lime were required, and the addition occupied about one hour. Stirring was continued for a further half hour, and the mixture then left to stand overnight to complete the separation of calcium sulphate. The mixture was stirred again to form an even suspension of the precipitated matter, largely calcium sulphate, and the slurry produced pumped into a filter press. The filter cake was washed with a small volume of water. The combined clear liquor and washings amounted to about 1060 litres, and had the following concentrations of principal components:

| | Grams per litre |
|---|---|
| Manganese sulphate | 174 |
| Ammonium sulphate | 31 |

The above liquor was transferred to a mixing vessel equipped with a high speed stirrer. Caustic soda solution containing 200 grams per litre of 96% NaOH was run into the vigorously stirred liquor until the pH value rose to 9, to precipitate manganese as hydroxide, care being taken to avoid high local concentrations of alkali. About 430 litres of the alkali were required and the addition occupied about an hour. Stirring was continued for about another half hour and the mixture passed to a filter press to recover the manganese hydroxide. The cake of product was washed in the press until the washings were free from sulphate, then dried in an oven at about 110° C. to a friable powder. The yield was 104 kgs. of product having the following percentage composition:

| | Percent |
|---|---|
| Manganese (Mn) | 54.9 |
| Silica, as $SiO_2$ | 0.04 |
| Calcium, as CaO | 0.02 |
| Sodium, as $Na_2O$ | 0.01 |

The remainder of the product was substantially water. The manganese recovered in the product amounted to 84% of the manganese in the original liquor.

*Example 2*

This example illustrates the application of the process to a liquor containing less than 5% of manganese, and free from ammonium salts, obtained from a ferrous chloride solution by treatment with a manganese oxide.

100 litres of a vigorously stirred solution containing the following principal components:

| | |
|---|---|
| Manganese chloride ($MnCl_2$) | 76 grams per litre. |
| Manganese (Mn) | 33 grams per litre. or 3.3% w./v. |
| Ferric chloride ($FeCl_3$) | 8 grams per litre. |
| Hydrochloric acid (HCl) | 5.5 grams per litre. |
| Suspended matter | 1.2 grams per litre. | were carefully treated with a caustic soda solution containing 100 grams of 96% NaOH per litre until the pH value rose to 8.5, to neutralise the free acid and precipitate the iron as hydroxide. Other matter precipitable at that pH value naturally separated also. About 12.5 litres of the caustic soda solution were required. The solution after stirring for another 20 minutes was allowed to settle overnight and then decanted through a filter. 4 kgs. of solid ammonium chloride were dissolved in the clear filtrate, which measured approximately 105 litres. The solution was again vigorously stirred and manganese precipitated as hydroxide by the slow addition of more of the caustic soda solution until the pH value of the liquor rose to 9. About 40 litres of the caustic soda solution were needed, and were added over a period of about 15 minutes. Stirring was continued for about another 15 minutes and the mixture then filtered on a filter press. The cake of manganese hydroxide was washed in the press until free from chloride, and then dried in an oven at about 110° C. to a friable powder. 5 kgs. of product were obtained having the following percentage composition:

| | Percent |
|---|---|
| Manganese (Mn) | 52.4 |
| Silica, as $SiO_2$ | 0.03 |
| Calcium, as CaO | 0.01 |
| Sodium, as $Na_2O$ | 0.01 |

The remainder of the product was substantially water. The manganese recovered in the product amounted to about 80% of the manganese in the original liquor.

In the above example hydrated lime may be used in place of the caustic soda, but the process is slower owing to the care needed to ensure that an excess quantity is not added at each stage, or that any undissolved lime remains in the product in the final stage.

We claim:

1. A process for recovering manganese as the hydroxide from acid aqueous liquor containing in solution manganous salt, comprising the steps of adding calcium hydroxide to said liquor in such restricted quantity that the pH of the liquor is raised to a value between 8.0 and 8.5, filtering off any impurities precipitated at that value, adding to the liquor, in presence of ammonium salt, sodium hydroxide in such restricted quantity that the pH value is increased to a value not greater than 9 whereby to cause manganese hydroxide to be precipitated without substantial co-precipitation of any compound of any metal other than manganese present in solution, and filtering off said precipitated manganese hydroxide.

2. A process for recovering manganese as hydroxide from acid aqueous liquor containing in solution manganous salt, comprising the steps of adding to said liquor a hydroxide selected from the group which consists of alkali metal hydroxides and alkaline earth metal hydroxide, said hydroxide being added to said liquor in such restricted quantity that the pH of the liquor is raised to a value between 8.0 and 8.5, separating any impurities precipitated at that value, adding to the resulting liquor, in presence of ammonium salt, a hydroxide which only forms soluble salts with any acid radicals present in the liquor and selected from the group consisting of alkali metal and alkaline earth metal hydroxides, in such restricted quantity that the pH value is increased to a value not greater than 9 whereby to cause manganese hydroxide to be precipitated without substantial co-precipitation of any compound of any metal other than manganese present in solution, and separating said precipitated manganese hydroxide.

3. A process for recovering manganese as the hydroxide from acid aqueous liquor containing in solution an amount of manganous salt which is less than 5% calculated as manganese, comprising the steps of adding to said liquor a hydroxide selected from the group which consists of alkali metal hydroxides and alkaline earth metal hydroxides, said hydroxide being added to said liquor in such restricted quantity that the pH of the liquor is raised to a value between 8.0 and 8.5, separating any impurities precipitated at that value, adding to the liquor, in presence of ammonium salt, a hydroxide which only forms soluble salts with any acid radicals present in the liquor and selected from the group consisting of alkali metal and alkaline earth metal hydroxides in such restricted quantity that the pH value is increased to a value not greater than 9 whereby to cause manganese hydroxide to be precipitated without substantial co-precipitation of any compound of any metal other than manganese present in solution, and separating said precipitated manganese hydroxide.

4. A process for recovering manganese as hydroxide from acid aqueous liquor containing in solution manganous salt in an amount which is over 5% calculated as manganese, comprising the steps of adding to said liquor a hydroxide selected from the group which consists of alkali metal hydroxides and alkaline earth metal hydroxides, said hydroxide being added to said liquor in such restricted quantity that the pH of the liquor is raised to a value of 8.0, separating any impurities precipitated at that value, adding to the resulting liquor, in presence of ammonium salt, a hydroxide which only forms soluble salts with any acid radicals present in the liquor and selected from the group consisting of alkali metal and alkaline earth metal hydroxides in such restricted quantity that the pH value is increased to a value not greater than 9 whereby to cause manganese hydroxide to be precipitated without substantial co-precipitation of any compound of any metal other than manganese present in solution, and separating said precipitated manganese hydroxide.

5. A process for recovering manganese as the hydroxide from acid aqueous liquor containing in solution manganous chloride, comprising the steps of adding to said liquor a hydroxide selected from the group which consists of alkali metal hydroxides and alkaline earth metal hydroxides, said hydroxide being added to said liquor in such restricted quantity that the pH of the liquor is raised to a value between 8.0 and 8.5, separating any impurities precipitated at that value, adding to the liquor, in presence of ammonium salt, a hydroxide selected from the group which consists of alkali metal hydroxides and alkaline earth metal hydroxides in such restricted quantity that the pH value is increased to a value not greater than 9 whereby to cause manganese hydroxide to be precipitated without substantial co-precipitation of any compound of any metal other than manganese present in solution, and separating said precipitated manganese hydroxide.

6. A process for recovering manganese as hydroxide from acid aqueous liquor containing in solution manganous sulphate, comprising the steps of adding to said liquor a hydroxide selected from the group which consists of alkali metal hydroxides and alkaline earth metal hydroxides, said hydroxide being added to said liquor in such restricted quantity that the pH of the liquor is raised to a value between 8.0 and 8.5, separating any impurities precipitated at that value, adding to the resulting liquor, in presence of ammonium salt, alkali metal hydroxide in such restricted quantity that the pH value is increased to a value not greater than 9 whereby to cause manganese hydroxide to be precipitated without substantial co-precipitation of any compound of any metal other than manganese present in solution, and separating said precipitated manganese hydroxide.

7. A process for recovering manganese as hydroxide from acid aqueous liquor containing in solution manganous chloride, comprising the steps of adding to said liquor calcium hydroxide in such restricted quantity that the pH of the liquor is raised to a value between 8.0 and 8.5, separating any impurities precipitated at that value, adding to the resulting liquor, in presence of ammonium salt, alkali metal hydroxide in such restricted quantity that the pH value is increased to a value not greater than 9 thereby to cause manganese hydroxide to be precipitated without substantial co-precipitation of any compound of any metal other than manganese present in solution, and separating said precipitated manganese hydroxide.

References Cited in the file of this patent
UNITED STATES PATENTS 2,176,776    Sweet et al.    Oct. 17, 1939
2,462,499    Hoak    Feb. 22, 1949

OTHER REFERENCES

Britton in "Chemical Society Journal," vol. 127, pages 2110–20 (1925).